United States Patent [19]

Hashimoto

[11] Patent Number: 4,813,067
[45] Date of Patent: Mar. 14, 1989

[54] APPARATUS FOR CONNECTING SELECTIVELY A TELEPHONE ANSWERING DEVICE OR ADDITIONAL EQUIPMENT, SUCH AS A FACSIMILE MACHINE, TO TELEPHONE LINES

[75] Inventor: Kazuo Hashimoto, Tokyo, Japan

[73] Assignee: Hashimoto Corporation, Tokyo, Japan

[21] Appl. No.: 104,086

[22] Filed: Oct. 5, 1987

Related U.S. Application Data

[63] Continuation of Ser. No. 823,092, Jan. 21, 1986, abandoned.

[30] Foreign Application Priority Data

Jan. 21, 1985 [JP] Japan .................................. 60-8660

[51] Int. Cl.⁴ .................... H04M 1/64; H04M 11/00
[52] U.S. Cl. ...................................... 379/67; 379/100
[58] Field of Search ............ 379/88, 93, 442, 67, 379/98, 102, 104, 105, 79, 82, 100

[56] References Cited

U.S. PATENT DOCUMENTS

| | | | |
|---|---|---|---|
| 3,879,579 | 4/1975 | Fretwell | 379/98 |
| 4,055,729 | 10/1977 | Vandling | 379/100 |
| 4,340,783 | 7/1982 | Sugiyama et al. | 379/98 |
| 4,341,926 | 7/1982 | Chester | 379/100 |
| 4,503,288 | 3/1985 | Kessler | 379/96 X |
| 4,546,382 | 10/1985 | McKenna et al. | |
| 4,578,534 | 3/1986 | Shelley | 379/93 X |
| 4,578,700 | 3/1986 | Roberts et al. | |
| 4,584,434 | 4/1986 | Hashimoto | 379/105 X |

*Primary Examiner*—Keith E. George
*Attorney, Agent, or Firm*—Lowe, Price, Leblanc, Becker & Shur

[57] ABSTRACT

A telephone connecting adapter connects one of a different terminal equipment alternately to a common telephone line upon every incoming call. If a calling party finds that the engaging equipment as a result of his call is not the desired one, the adapter connects a different terminal equipment to the telephone line upon next call. This makes it possible to shorten the access time for the desired equipment using same telephone line.

2 Claims, 1 Drawing Sheet

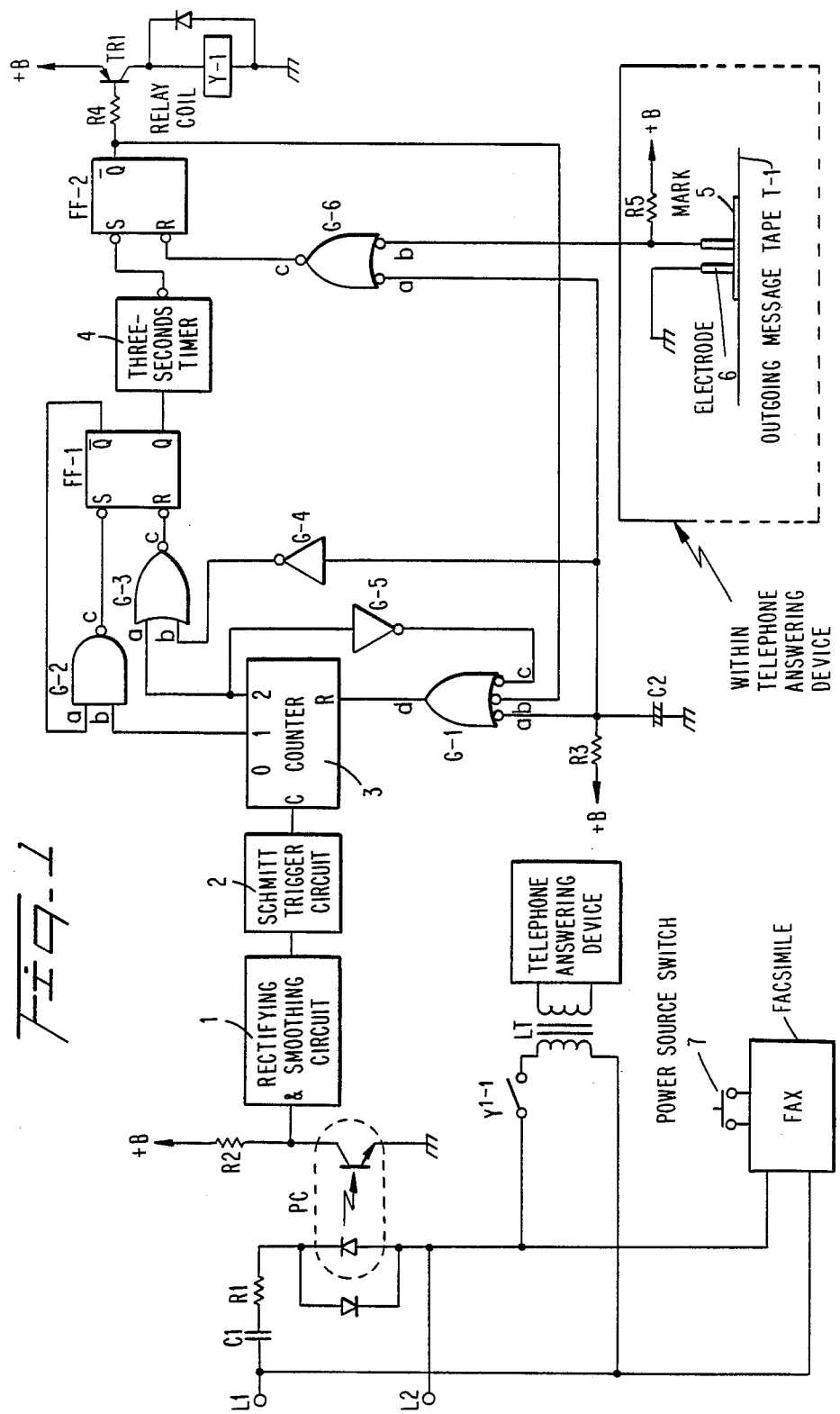

APPARATUS FOR CONNECTING SELECTIVELY A TELEPHONE ANSWERING DEVICE OR ADDITIONAL EQUIPMENT, SUCH AS A FACSIMILE MACHINE, TO TELEPHONE LINES

This application is a continuation of Application Ser. No. 823,092, filed Jan. 21, 1986 now abandoned.

BACKGROUND OF THE INVENTION

The present invention relates to a telephone switching adapter for automatic switching of plural pieces of terminal equipment onto the same telephone line.

A conventional facsimile receiving unit, which is connected to the general telephone line and set in the standby mode, will be automatically engaged upon incoming ringing signals and immediately send back a particular electronic acknowledgment signal to the calling party. This electronic acknowledgment signal can appear to be very strange when heard by a calling party who expected a conventional ring back tone, wanting to speak with a particular called party and not to send to the facsimile device. This can result in confusion to the calling party whose continuing attempts to reach a particular called party are constantly defeated by the facsimile receiving unit intercepting the call. This tendency will have important problems for future home communication systems.

SUMMARY OF THE INVENTION

A first object of the invention is to make possible the alternate selection of either a telephone answering device or a facsimile receiving unit in response to calling by a party from an outside telephone.

A second object of the invention is to maintain a 50% access possibility for either of two pieces of equipment to be alternately engaged to the telephone line upon detection of a calling signal.

A third object of the invention is to make to maintain a 33% access possibility for any of three pieces of equipment to be sequentially engaged to the telephone line upon detection of a calling signal.

The above and other objects, features and advantages of the present invention will become more apparent from the following description when taken in conjunction with the accompanying drawing in which a preferred embodiment of the present invention is shown by way of illustrative example.

BRIEF DESCRIPTION OF THE DRAWING

The single FIGURE is a circuit diagram of the present invention.

DESCRIPTION OF THE PREFERRED EMBODIMENT

The arrangement and operations of the preferred embodiment according to the present invention will be described with reference to the accompanying drawing.

Reference symbols L1 and L2 denote the telephone lines. PC denotes a photocoupler for detecting a calling signal. Reference numeral 1 denotes a rectifying and smoothing circuit for calling signal envelope which is detected through the above photocoupler; 2, a Schmitt trigger circuit for conditioning the said calling signal envelope; 3, a counter for counting the said calling signal waveform. A terminal C is a clock terminal, a terminal R is a reset terminal, a terminal 1 is a counter output terminal which generates a high output level with count number 1 and a terminal 2 is a counter output terminal which generates a high output level with count number 2. FF-1 and FF-2 denote R-S type flip-flop circuits. Reference numeral 4 denotes a threesecond timer which generates a low output level for about 3 seconds when a terminal Q of the above FF-1 is switched from a low to a high output level. Y-1 denotes a relay which is energized when the calling signal rings once or three times as mentioned later, whose contact y1-1 forms the engaging circuit of the telephone line of the present telephone answering device. A motor for an outgoing message tape T-1 and an associated amplifier are supplied power by another known contact (not shown). LT denotes a line transformer of the telephone answering device. Reference numeral 5 denotes a signal mark on the outgoing message tape T-1 and 6 denotes an electrode for detecting the mark. FAX denotes a facsimile device connected to the same telephone line as the above telephone answering device. FAX is arranged to engage the telephone line when the calling signal rings twice while a power source switch 7 is turned on. In contrast, the telephone answering device is set to engage the telephone line prior to detecting a second ring.

Operation will be described. First the present device is supplied by an electric power source and a condenser C 2 resets a counter 3 and the flip-flop circuits FF-1 and FF-2, as shown in the figure. Accordingly the terminal Q of the flip-flop circuit FF-1 is held high and a terminal a of NAND gate G-2 goes high. As counter 3 is reset, terminal b of G-2 is low. As flip-flop circuit FF-2 is reset, terminal $\bar{Q}$ of FF-2 is high and transistor TR 1 and relay Y-1 are not energized.

When a calling signal comes into the telephone lines L1 and L2 in the above condition, the 16 Hz calling signal is detected by photocoupler PC as shown in the figure and rectified by the rectifying circuit 1, detected and conditioned by Schmitt trigger circuit 2, and input to clock terminal C of counter 3. The counter counts one when the calling signal rings once. (In Japan, the 16 Hz calling signal is composed of a one second ring followed by a two second pause interval.) Accordingly when the calling signal rings once, the counter 3 counts one and output terminal 1 goes high. Now flip-flop circuit FF-1 is set through NAND gate G-2 as mentioned above. As the flip-flop circuit FF-1 is set, NAND gate G-2 is non-activated through terminal a of G-2. When the terminal Q of FF-1 goes high, three-second timer 4 is energized and flip-flop circuit FF-2 is set. When the flip-flop circuit FF-2 is set, the transistor TR 1 is energized and keeps the relay Y-1 in the operation mode. The engaging circuit of the telephone line is formed by the contact y1-1 of relay Y-1 through the line transformer LT. Since the telephone answering device is set to engage the telephone line prior to detecting a second ring, the calling signal stops after one ringing. Even if the facsimile FAX is supplied electric power source, the FAX is not activated in this case of one ringing of the calling signal because FAX is arranged to be activated only after two ringings of the calling signal as mentioned above. At the same time, counter 3 is kept reset by output terminal $\bar{Q}$ of FF-2 through NOR gate G-1. As for the telephone answering device, when the relay Y-1 is maintained in the operation mode as mentioned above, through another known contact (not shown) the direct current motor and the amplifier are supplied power and outgoing message tape T-1 starts. At the same time, the prerecorded outgoing message is played back and sent out into the telephone line through line transformer LT.

When the outgoing tape message completes one cycle, conductive foil 5 again bridges electrode 6, causing flip-flop circuit FF-2 to be reset, and deenergizing relay Y-1, thereby disconnecting the telephone answering device from the telephone lines with the present device returning to the standby mode.

As described, flip-flop FF-1 was set and NAND gate G-2 was non-activated upon receiving the above-mentioned first call. Upon reception of the next call, if the calling signal stops ringing and the counter 3 only counts to one, there is no operation. When the next calling signal stops ringing and the counter 3 counts two, terminal 2 goes high and flip-flop circuit FF-1 is reset through terminals a and c of NOR gate G-3. At the same time, the counter 3 is itself reset through inverter G-5 and terminals e, d of NOR gate G-1. The counter 3 returns to the beginning condition. Now the facsimile FAX which is arranged to be operated when the calling signal rings twice is operated and the engaging circuit of the telephone line is formed by the engaging means which FAX contains. The calling signal thus stops ringing after said two ringings.

When the facsimile transmission is completed and the next (third) call arrives, the telephone answering device, having been reconnected to the telephone line, is operated after one ringing of the calling signal in the same way as the first reception of calling signal. This is because the flip-flop circuit FF-1 was reset and the counter 3 returned to the beginning condition upon receiving of the second call. The facsimile FAX is operated upon reception of a call after the telephone answering device is operated upon reception of a call after the FAX was operated. These operations are repeated upon every reception of the call.

In the situation where power switch 7 of facsimile FAX is turned off, the telephone answering device is operated when the calling signal stops ringing once upon the first reception of a call. As the flip-flop circuit FF-1 was set as mentioned above, FF-1 is reset and the counter 3 is reset via inverter G-5 and gate G-1 as mentioned above when the calling signal stops ringing twice upon the second reception of call. When the next calling signal stops ringing, the counter 3, having been reset, counts to one in the same way as upon the first reception of call. As a result, upon the third ring of a calling signal, flip-flop circuit FF-1 is set through the NAND gate G-2, the flip-flop circuit FF-2 is also set through timer 4, relay Y-1 is energized and the engaging circuit of telephone line is formed. Thus, so long as the power source switch of FAX is turned off, the line of the telephone answering device is engaged when the calling signal stops ringing after three ringings upon every reception of call. As the telephone answering device is provided with a monitoring function to amplify the calling party's message through a loudspeaker during the period when the outgoing message is being sent, after tuning on the facsimile in response to the calling party's message, the calling party then makes a second call and the FAX is operated as mentioned above upon the second ring. Upon receiving a call after a FAX operation, the telephone answering device is reconnected and is operated upon the calling signal. Needless to say, the FAX is operated separately according to the electric power source of FAX itself, having no relation to the said first or third ringing when the electric power source of the telephone answering device is turned off.

With this telephone connecting adapter, in response to a first call from an outside telephone, the FAX is operated, upon receiving a second call the telephone answering device is operated and upon receiving a third call the FAX is operated, etc. In this way, there is a 50% probability that either the FAX or the telephone answering device is engaged. Since telephone charges issued by the hour rather than by the call are being gradually implemented and such charges have already been implemented in long distance calls, this redial operation never wastes calling time. When the FAX is engaged to the telephone line upon a call, the calling party hangs up the telephone and makes a second call, so that the telephone answering device becomes engaged. Moreover, a modern telephone set itself is incorporated with a repeat function. Using this last number repeat dial function, the same telephone number is immediately redialed upon the operation of one button after hang-up, without inconvenience to the user. For the above two reasons, the present invention has much more merit in practical use than any other conventional devices.

The telephone answering device has a particular O.G.M. which instructs the calling party to call again if access to wrong equipment occurs as a result of the incoming call.

The present invention is exemplified only by the facsimile and the telephone answering device, but can also be applied to a personal computer or various terminal equipments or the like which needs the calling signal (16 Hz or 20 Hz) to operate.

According to the present invention, the problem that is produced when people call the telephone has been solved by keeping the telephone answering device and the facsimile in the standby mode alternately, by switching input of the calling signal alternately and engaging either the telephone answering device or the facsimile to operate. The telephone answering device provides an appropriate O.G.M. to the caller depending upon whether desired equipment is accessed during the incoming call. Therefore, the present invention is very advantageous in practical use.

Although a certain preferred embodiment has been shown and described, it should be understood that many changes and modifications may be made therein without departing from the scope of the invention.

What is claimed is:

1. In a telephone system that receives different incoming telephone calls on a telephone line, an automatic switching device for connecting alternately a telephone answering device and an additional apparatus, such as a facsimile machine, to the telephone line, comprising:

means for detecting incoming calls on the telephone line from a caller who desires to access only one of the telephone answering device and the additional apparatus;

means responsive to a first one of said incoming calls for connecting only one of said telephone answering device and said additional apparatus to the telephone line, whereby as a result of the first call there is a fifty percent probability that the caller will access a desired one of said telephone answering device and said additional apparatus; and means responsive to the next incoming call on the telephone line for connecting only the other one of said telephone answering device and the additional apparatus to said telephone line, whereby the caller can hang up the first call immediately and place the next call to access the other one of said telephone answering device and said additional apparatus when the caller realizes that the desired one of said telephone answering device and said additional apparatus has not been accessed;

said first and second connecting means connecting alternately said telephone answering device and said additional apparatus in response continuously, to successive incoming calls;

wherein the telephone answering device has a prerecorded outgoing message which instructs the caller to call again if access by the caller as a result of said first call is not to the desired one of said telephone answering device and said additional apparatus.

2. A device according to claim 1 further comprising:
wherein signals for each said incoming call comprise multiple ringing signals separated by pauses,
means for counting said ringing signals;
means for comparing a count of said ringing signals with a predetermined value; and
means responsive to said comparing means for reconnecting to the telephone line the telephone answering device or additional apparatus previously disconnected from the telephone line, wherein said predetermined value represents a whole number of ringing signals to be counted.

* * * * *